US007308399B2

(12) United States Patent
Fallen-Bailey et al.

(10) Patent No.: US 7,308,399 B2
(45) Date of Patent: Dec. 11, 2007

(54) SEARCHING FOR AND UPDATING TRANSLATIONS IN A TERMINOLOGY DATABASE

(75) Inventors: Tim Fallen-Bailey, Foster City, CA (US); Ivan Wong, South San Francisco, CA (US); Ramesh Kumaraswami, San Mateo, CA (US); Anupama Ramesh, San Mateo, CA (US); Eric Jia He, Fremont, CA (US); Henry Yingqi Feng, San Carlos, CA (US); Nikolai Tsepalov, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 687 days.

(21) Appl. No.: 10/177,891

(22) Filed: Jun. 20, 2002

(65) Prior Publication Data

US 2007/0225965 A1 Sep. 27, 2007

(51) Int. Cl.
*G06F 17/20* (2006.01)
*G06F 17/28* (2006.01)

(52) U.S. Cl. .................... 704/8; 704/2; 704/4
(58) Field of Classification Search .............. 704/8, 704/2, 3, 4, 5, 7, 10; 717/136–161
See application file for complete search history.

(56) References Cited

U.S. PATENT DOCUMENTS

| 5,434,776 A | * | 7/1995 | Jain .............................. 704/8 |
| 5,528,491 A | * | 6/1996 | Kuno et al. .................... 704/9 |
| 5,583,761 A | * | 12/1996 | Chou .......................... 715/536 |
| 5,664,206 A | * | 9/1997 | Murow et al. ................. 704/8 |
| 5,678,039 A | * | 10/1997 | Hinks et al. .................... 707/4 |
| 5,974,372 A | * | 10/1999 | Barnes et al. .................. 704/8 |
| 6,092,036 A | * | 7/2000 | Hamann ........................ 704/8 |
| 6,118,783 A | * | 9/2000 | Kunito ........................ 370/399 |

(Continued)

FOREIGN PATENT DOCUMENTS

JP    10024332    *  8/1999

(Continued)

OTHER PUBLICATIONS

Anderrson, Fredrik. "Advanced string techniques in C++-part 1: Unicode". Aug. 28, 2000.☐☐http://www.flipcode.com/articles/article_advstrings01.html.*

(Continued)

*Primary Examiner*—Tālivaldis Ivars Šmits
*Assistant Examiner*—Douglas C Godbold
(74) *Attorney, Agent, or Firm*—Campbell Stephenson LLP

(57) ABSTRACT

Text strings from computer-based applications are converted from multiple external formats into an internal format. The text strings are stored in a terminology database. Translations for the test strings are also stored in the terminology database and associated with the corresponding text strings. In one aspect, text strings are converted into a export format for translation into one or more target languages. The translations are converted into the appropriate external formats and output to the applications that supplied the text strings. In another aspect, the terminology database is queried for an appropriate translation for each newly converted text string. In still another aspect, metadata for the text strings is created and associated with the text strings in the terminology database, and used as query criteria to determine the appropriate translation. The metadata may be exported in conjunction with the text strings.

45 Claims, 6 Drawing Sheets

U.S. PATENT DOCUMENTS

| | | | |
|---|---|---|---|
| 6,189,045 B1* | 2/2001 | O'Shea et al. | 709/246 |
| 6,202,099 B1* | 3/2001 | Gillies et al. | 719/317 |
| 6,397,232 B1* | 5/2002 | Cheng-Hung et al. | 715/523 |
| 6,473,729 B1* | 10/2002 | Gastaldo et al. | 704/4 |
| 6,789,057 B1* | 9/2004 | Morimoto et al. | 704/2 |
| 6,904,401 B1* | 6/2005 | Hauduc et al. | 704/8 |
| 6,971,096 B1* | 11/2005 | Ankireddipally et al. | 718/101 |
| 6,986,104 B2* | 1/2006 | Green et al. | 715/523 |
| 7,130,792 B2* | 10/2006 | Tokieda et al. | 704/7 |
| 2002/0107684 A1* | 8/2002 | Gao | 704/4 |
| 2003/0212542 A1* | 11/2003 | Lee et al. | 704/7 |

OTHER PUBLICATIONS

Maunder, Chris. "The code project: Unicode, MBCS and generic text mappings." Mar. 29, 2000. http://www.codeproject.com/cpp/unicode.asp.*

* cited by examiner

SEARCHING FOR AND UPDATING TRANSLATIONS IN A TERMINOLOGY DATABASE

FIELD OF THE INVENTION

This invention relates generally to localization of computer-based applications, and more particularly to translating application terminology into local languages.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Siebel Systems, Inc., All Rights Reserved.

BACKGROUND OF THE INVENTION

Computer-based applications generally contain textual data that is presented to a user to allow the user to interact with the applications. The textual data is written in a human language, usually the native language of the country of the developer or a common language, such as English. When the application is destined for use in other countries, typically the textual data is manually translated into the various local languages as part of a process commonly referred to as "localization." Localization must be performed for each new version of the application. When localization must be repeatedly performed on a suite of interrelated applications, the cost of localizing the applications into many languages can be very high. Additionally, if the applications in the suite are provided by different vendors, the complexity of dealing with multiple file formats increases the costs accordingly.

SUMMARY OF THE INVENTION

Text strings from computer-based applications are converted from multiple external formats into an internal format. The text strings are stored in a terminology database. Translations for the test strings are also stored in the terminology database and associated with the corresponding text strings. In one aspect, text strings are converted into a export format for translation into one or more target languages. The translations are converted into the appropriate external formats and output to the applications that supplied the text strings. In another aspect, the terminology database is queried for an appropriate translation for each newly converted text string. In still another aspect, metadata for the text strings is created and associated with the text strings in the terminology database, and used as query criteria to determine the appropriate translation. The metadata may be exported in conjunction with the text strings.

The present invention describes systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
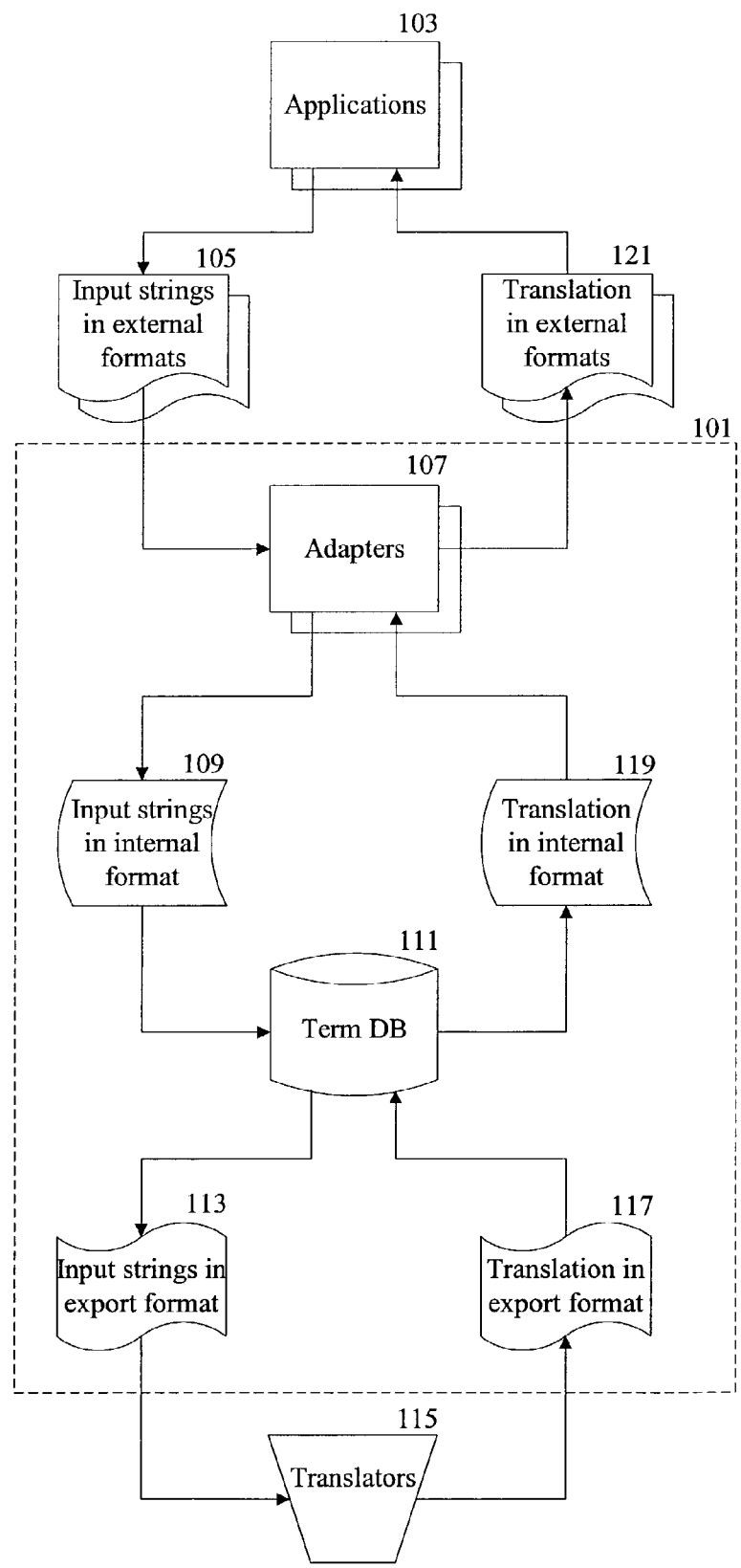
FIG. 1A is a diagram illustrating a system-level overview of an embodiment of the invention.

A system level overview of the operation of an embodiment of a terminology database translation system 101 that facilitates localization of multiple related applications is described by reference to FIG. 1A. Computer-based applications from multiple vendors may interface with a core application to present the data processed by the core application to a user on various hardware and software platforms and to provide additional functionality to the core application. The multiple related applications, including the core application, are represented as applications 103 in FIG. 1A. Typically, user viewable text in the applications 103 are written in a particular language, referred to as a "source" language, which must be translated into various target languages before the applications 103 can be effectively used in different countries. The text may be messages directed to the user, words on buttons and other types of controls presented on a screen, captions that describe information to be entered, etc. The text may consist of a single word, a phrase, or a set of phrases, all of which are referred to herein as "text strings." Generally, the applications 103 each store their text strings and associated information, such as the executable code to present a screen, in a particular, often proprietary file format, illustrated as external file formats 105 in FIG. 1A. When the applications 103 must be localized into a different language, adapters 107 in the terminology database translation system 101 convert the text strings in the various external formats 105 into a common internal format 109. Each external format 105 normally requires a separate adapter 107 but common components may be shared among adapters. Each adapter 107 also creates metadata from the information associated with the text strings by the applications 103. The metadata describes the corresponding text strings, and may include an identifier for the source application 103 and for each text string, the version of the corresponding adapter 107, identifiers for the screens on which the text strings appear, locations within the screen for the text strings, maximum string lengths, the external format, etc. The metadata also specifies one or more target languages for the localization. One embodiment of text strings and metadata in the internal format 109 is described in more detail below in conjunction with FIG. 1B.

A terminology database ("term DB") 111 in the terminology database translation system 101 contains records of text strings and associates each text string in the source language with its various translations in the target languages. Each text string may be associated with multiple translations for each target language depending on its metadata. For example, the English word "account" may mean a customer in one context and a bank account in another. The term DB 111 may also contain the corresponding metadata for the text string in the same or separate records as the text string records, and maintains logical linkages between the text strings and the associated metadata. It will be appreciated that a single text string may be associated with multiple instances of metadata when the text string appears in multiple contexts. One embodiment of the term DB 111 is described further below in conjunction with FIG. 1C.

The term DB 111 is queried for an appropriate translation for each input text string. Various types of query criteria, including some or all of the metadata, may be used by the term DB 111 to determine the appropriate translation as explained below in conjunction with FIG. 2. If an appropriate translation is found, the translation in the internal format 119 is sent to the appropriate adapter 107 for conversion into the external format 121 and subsequent output to the application 103 that was the source of the text string. The terminology database translation system 101 may output the translations individually or as a group of translations, such as when all text strings for a particular application 103 have been translated or on a periodic basis.

If an appropriate existing translation of a text string is not found in the term DB 111, the text string and associated metadata is stored in the term DB 111 and marked for translation. At various times, the marked text strings are converted from the internal format 109 into an export format 113 and sent to translators 115 for translation into the specified target language(s). The export format 113 may contain the text strings and associated metadata, or some or all of the metadata may be sent separately with logical links to the text strings. In one embodiment, all marked text strings for a particular application 103 are sent as a batch. In another embodiment, all marked text strings for a particular language are sent to the appropriate translators 115 as a "localization kit." The metadata for a text string included in a batch or kit specifies an identifier for the batch/kit. Additionally, each batch/kit may specify identifiers for the included text strings.

The translations in the export format 117 are returned from the translators 115 to the term DB 111. The terminology database translation system 101 stores the translations in the term DB 111 and associates the translations with the input text strings and metadata. As described above, the translated text strings are sent to the adapters 107 for return to the applications 103 individually, in groups, or all at once.

It will be appreciated that the internal format may be any file format that can be processed by the term DB 111, including various character coding schemes such as Unicode. Furthermore, it will be appreciated that the export format may be any file format that can encode the input text strings, translations, and optionally the metadata. In one embodiment, the export format is based on the extensible markup language (XML) specification.

Figure 1B:
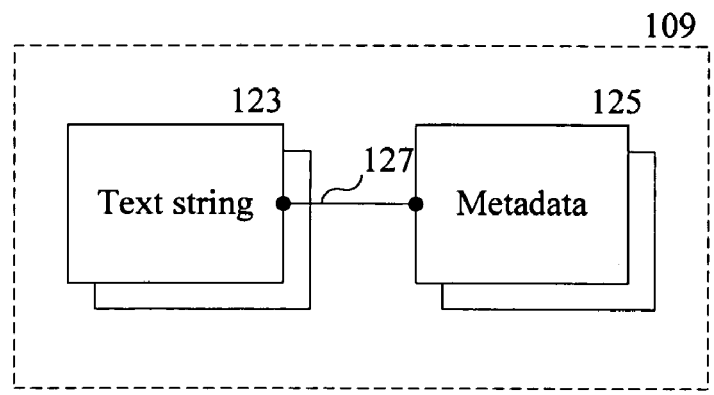
FIGS. 1B-C are diagrams illustrating embodiments of components of FIG. 1A.

FIG. 1B illustrates an internally formatted file 109 containing text strings 123 and corresponding metadata 125 associated through a logical link 127, which may be identifiers or other types of pointers that link each text string 123 to its metadata 125. As previously described, the metadata 125 associates the input text string with the external format in which it was received, so that the translation can be properly converted from the internal format to the external format, and contains information that identifies the text string and the context in which it appears. The context information in the metadata 125 may also be used to aid the translator 115 in producing a correct and accurate translation. In one embodiment, the metadata includes a reproduction of the actual visual content for the text string as described in conjunction with FIG. 1D further below.

Figure 1C:
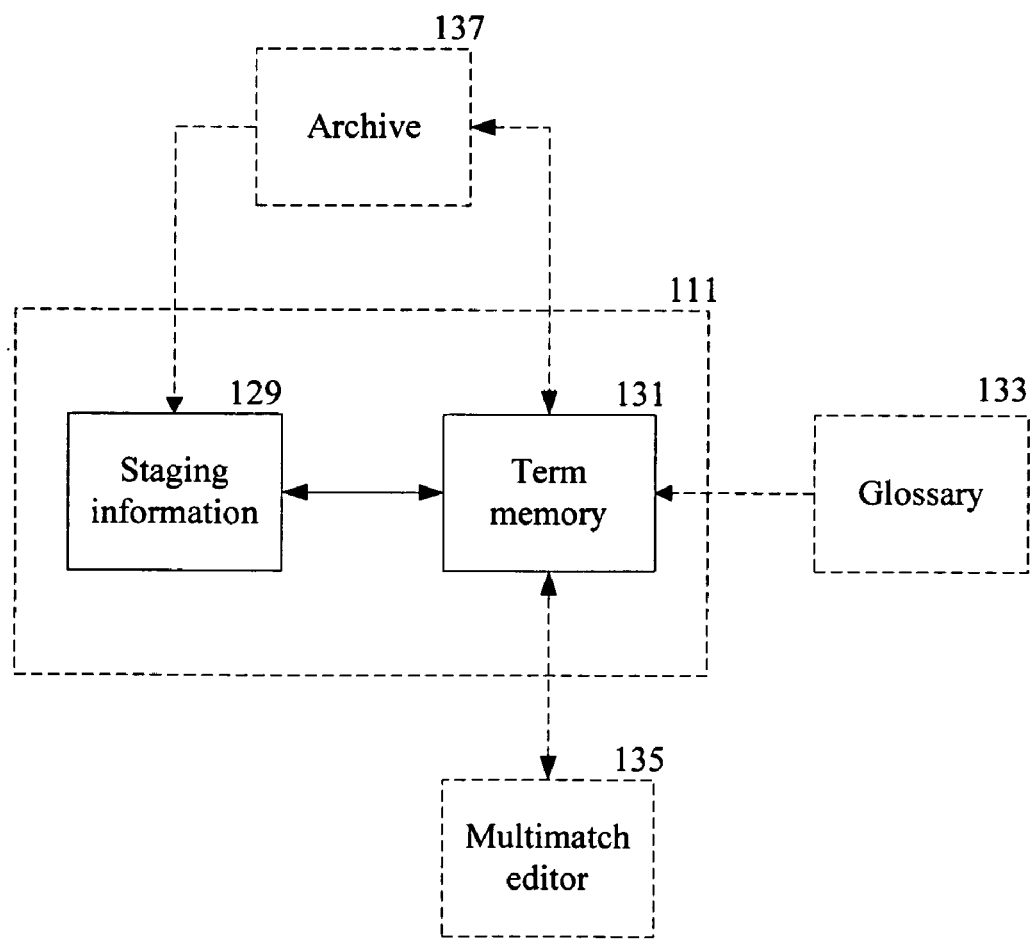

As illustrated in FIG. 1C, one embodiment of the term DB 111 consists of two components: staging information 129 and term memory 131. The staging information 129 and the term memory 131 may be separate files or different types of records within the term DB 111.

If there is no matching translation for an input text string and metadata, the input text string is stored in the term memory 131 (if not already present) and the corresponding metadata is stored in the staging information 129 with a link to the text string. When the corresponding translation 117 is received from the translators 115, it is stored in the term memory 131, linked to the text string, and the metadata link is updated to refer to the translation.

In an alternate embodiment illustrated in FIG. 1C in phantom, when a translation is received, a multimatch editor 135 is invoked to approve the translation before it is stored in the term memory 131. The multimatch editor 135 may be a automated or manual process. An automatic version of the multimatch editor 135 may incorporate a commercially available language translation engine. When the multimatch editor 135 is a manual process, it may present alternate translations to the user and/or give the user the option of inputting a more accurate translation. The alternate translations may be chosen from the existing translations for the text string in the term memory 131.

In another alternate embodiment, when localization for a particular language is to be performed for the first time, a glossary 133 containing selected text strings is initially sent to the translators 115. Once the translation of the glossary 133 is approved, the glossary 133 is used to initialize the term memory 131 for subsequent translation sessions as illustrated in FIG. 1C (in phantom). The text strings may be selected on their frequency of occurrence, their length, or on other criteria. The glossary 133 may change over time as different text strings are translated and stored in the term memory 131. Typically the size of the glossary 133 is kept small to facilitate its rapid translation into a new language.

In yet another alternate embodiment shown in FIG. 1C, an application code archive 137 (in phantom) stores text strings, translations, and metadata for one or more applications, and is used to initialize the staging information 129 and term memory 131 for a translation session. New translations in the term memory 131 are written to the archive 137.

Figure 1D:
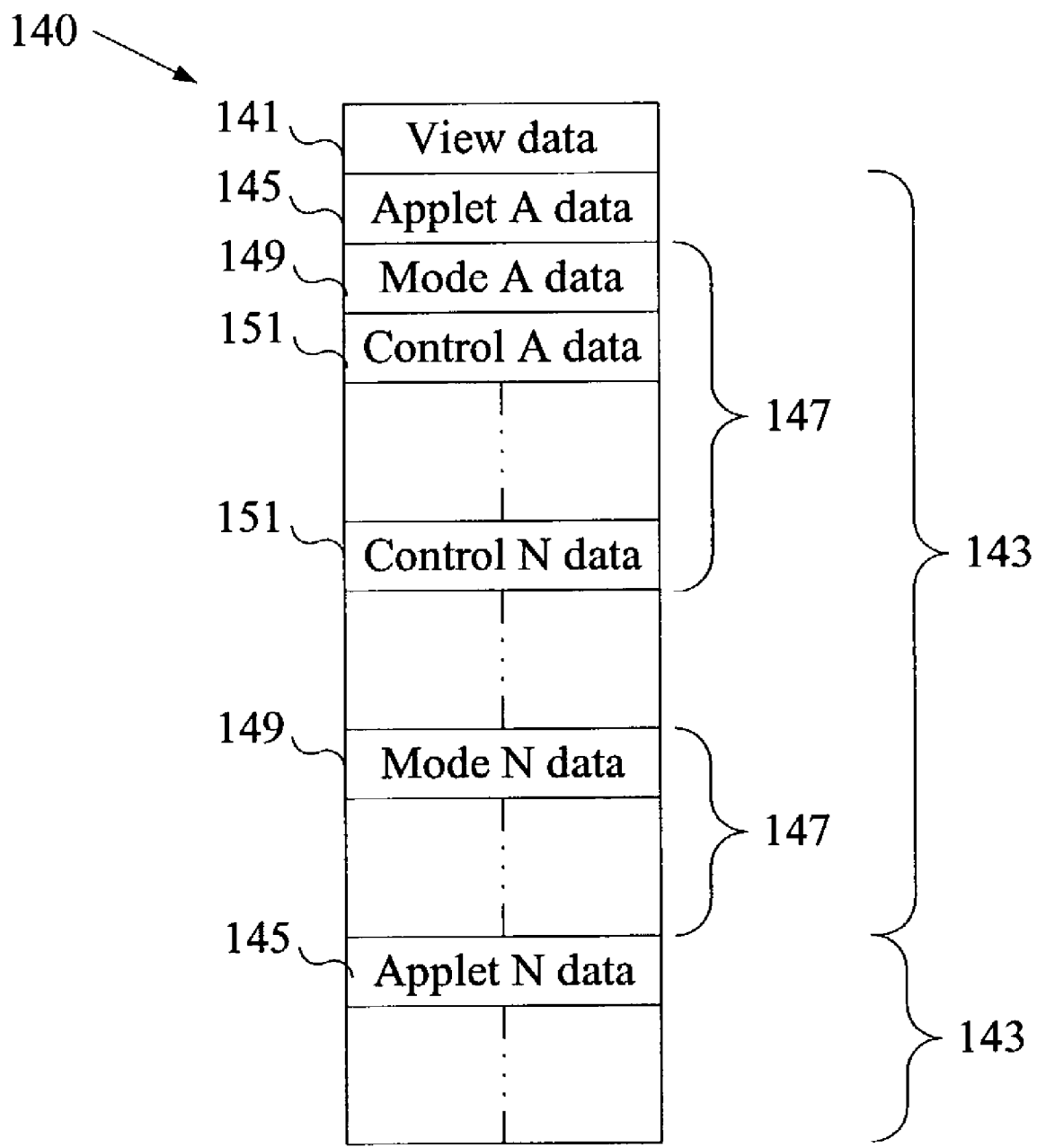
FIG. 1D is a diagram of an emulation file data structure for use in an embodiment of the invention.

Turning now to FIG. 1D, an emulation file 140 is described that presents a representation of a visual context for a text string when executed. The emulation file 140 contains data to recreate a screen, or view, presented to a user by an application without having to execute the application itself. The data in the emulation file 140 is typically coded in a markup language such as HTML (hypertext markup language) or XML. The emulation file 140 contains view data 141, including, for example, an identifier for the view and markup code that specifies the font, color, location, etc. of the entire view. An applet entry 143 is present in the emulation file 140 for each applet within the view. The applet entry 143 contains applet data 145 including an applet identifier and the general markup code for the applet. The applet entry 143 also contains a mode entry 147 for each applet layout that could appear in the view. Each mode entry 147 contains mode data 149 identifying the mode and its markup code, and identifiers and markup code for one or more applet user controls 151 that are part of the applet.

When more than one mode entry 147 exists, the applet data 145 further contains markup code that presents the different applet modes in response to user input. In one embodiment, a default mode is initially presented when the emulation file 140 is executed and clicking within the boundaries of the applet causes the markup code in the applet data 145 to show all the modes within the view. It will be appreciated that the various entries in the emulation file 140 may hold pointers to other files that contain the markup code and other data for the entries. Additionally, although only a single view is illustrated as being stored in the emulation file in FIG. 1D, the invention is not so limited.

The emulation file 140 may be created by extracting the visual context information for the views, applets, modes and controls from the information associated with the input text strings 105 when they are converted into the internal format. Each emulation file 140 may be sent to the translators as part or, or separate from, the text strings in the export format 113. Furthermore, a reference to the emulation file 140, and not the file itself, may be sent that allows access to the emulation file 140 through a network connection, such as a URL that causes the emulation file 140 to represent the visual context in a browser connected to the Internet.

Figure 2:
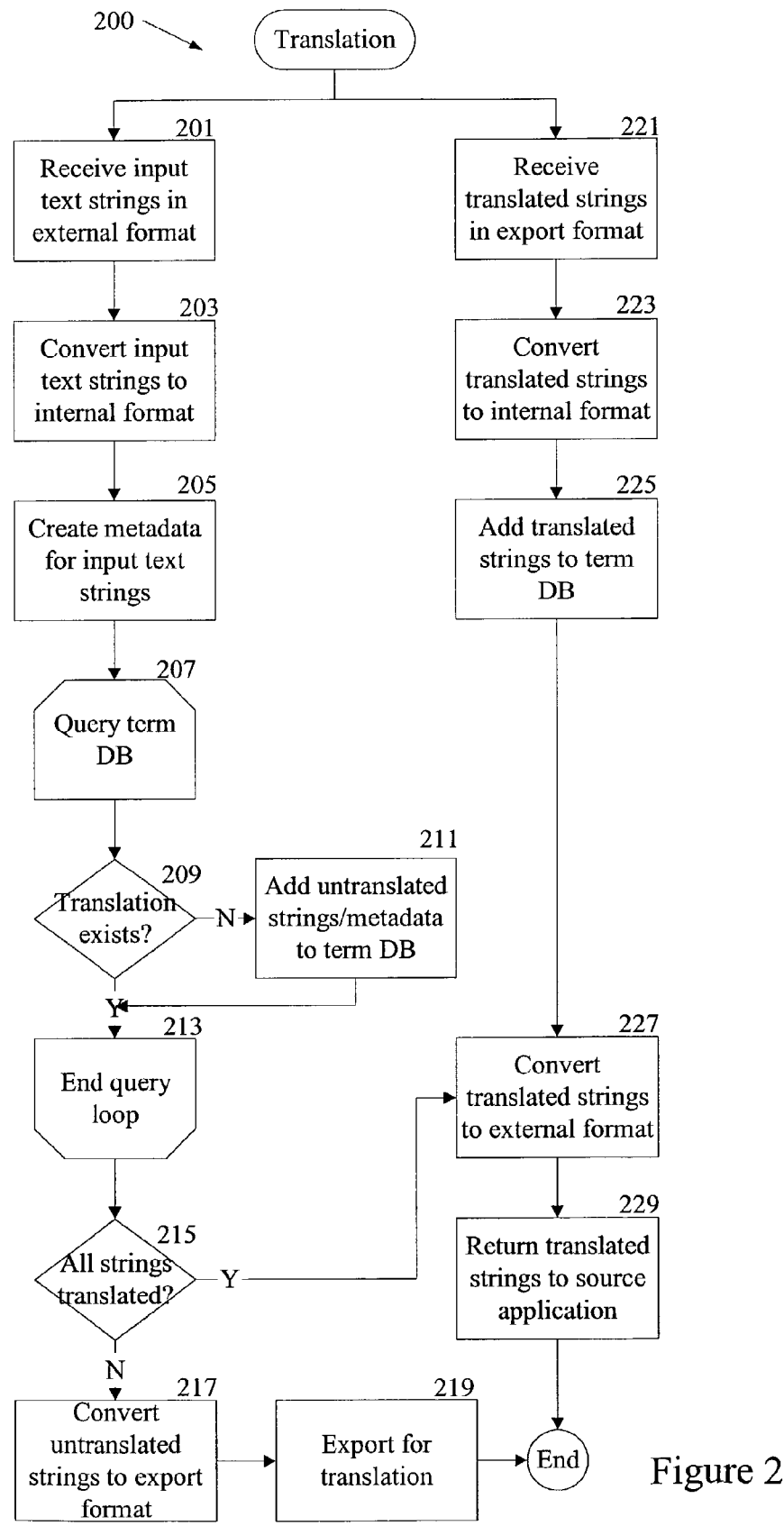
FIG. 2 is a flowchart of a method to be performed by the embodiment of FIG. 1A.

One embodiment of a translation method 200 to be performed by the terminology database translation system 101 is described with reference to flowchart shown in FIG. 2. The translation method 200 uses two threads of execution to perform its functions, one thread beginning at block 201 to process the input text strings from the applications 103, and another thread beginning at block 221 to process the translations from the translators 115. Although for sake of clarity each of the threads of execution is described below in terms of a single instance, it will be appreciated that multiple instances of one or both of the threads may be executing at one time to handle the multiple external formats and target languages.

Starting with block 201, the translation method 200 receives input text strings from one of the source applications in one of the multiple external formats. The method 200 converts the input text strings from the external format into the internal format (block 203) and creates the metadata for the input text strings (block 205) from the information associated with the input text strings. The translation method 200 queries the terminology data base for a match on each input text string to determine if an appropriate translation in the specified target language exists within the term database (blocks 207 until 213).

If an appropriate translation does not exist (block 209), the input text string and/or associated metadata are added to the terminology database at block 211. As one of skill in the art will readily understand, the text string may have been previously stored in the terminology database but associated with different metadata, and thus only the metadata need be stored and logically linked to the existing text sting at block 211. Once the terminology database has been queried for all the input text strings (block 213), the method 200 determines if all the input text strings have been translated (block 215). If not, the method 200 converts the untranslated input text strings into the export format (block 217) and exports the text strings for translation at block 219. On the other hand, if the terminology database contains the target language translations for all the input text strings (block 215), the translations are converted into the appropriate external format (block 227) and returned to the source application (block 229).

Assuming some text strings have been exported for translation, the method 200 receives the translations in the export format at block 221. The translations are converted into the internal format (block 223) and added to the terminology database (block 225). When added, the translations are logically linked to the stored input text strings and the appropriate metadata. The translations subsequently are converted into the external format at block 227 and returned to the source application at block 229. As described previously, the processes represented by blocks 227 and 229 may be performed for individual or groups of translations at various times.

It will be appreciated that the searching process represented by block 209 may be utilize various database queries and query criteria. In one embodiment, the query criteria includes the text string and the identifiers for the application, view and applet. The query may specify an exact match on all the query criteria, may use a subset of the available query criteria, or may weight the query criteria. If the text string includes special characters, the query may accept only translations that contain the special character. Alternatively, if the text string appears in the glossary, the translation associated with the glossary entry may be deemed the best match without regard to the other query criteria.

In practice, the translation method 200 may constitute one or more programs made up of machine-executable instructions. Describing the method with reference to the flowchart in FIG. 2 enables one skilled in the art to develop such programs, including such instructions to carry out the operations (acts) represented by logical blocks 201 until 229 on suitably configured machines (the processor of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the method illustrated in FIG. 2 without departing from the scope of the invention and that no particular order is implied by the arrangement of blocks shown and described herein.

Figure 3A:
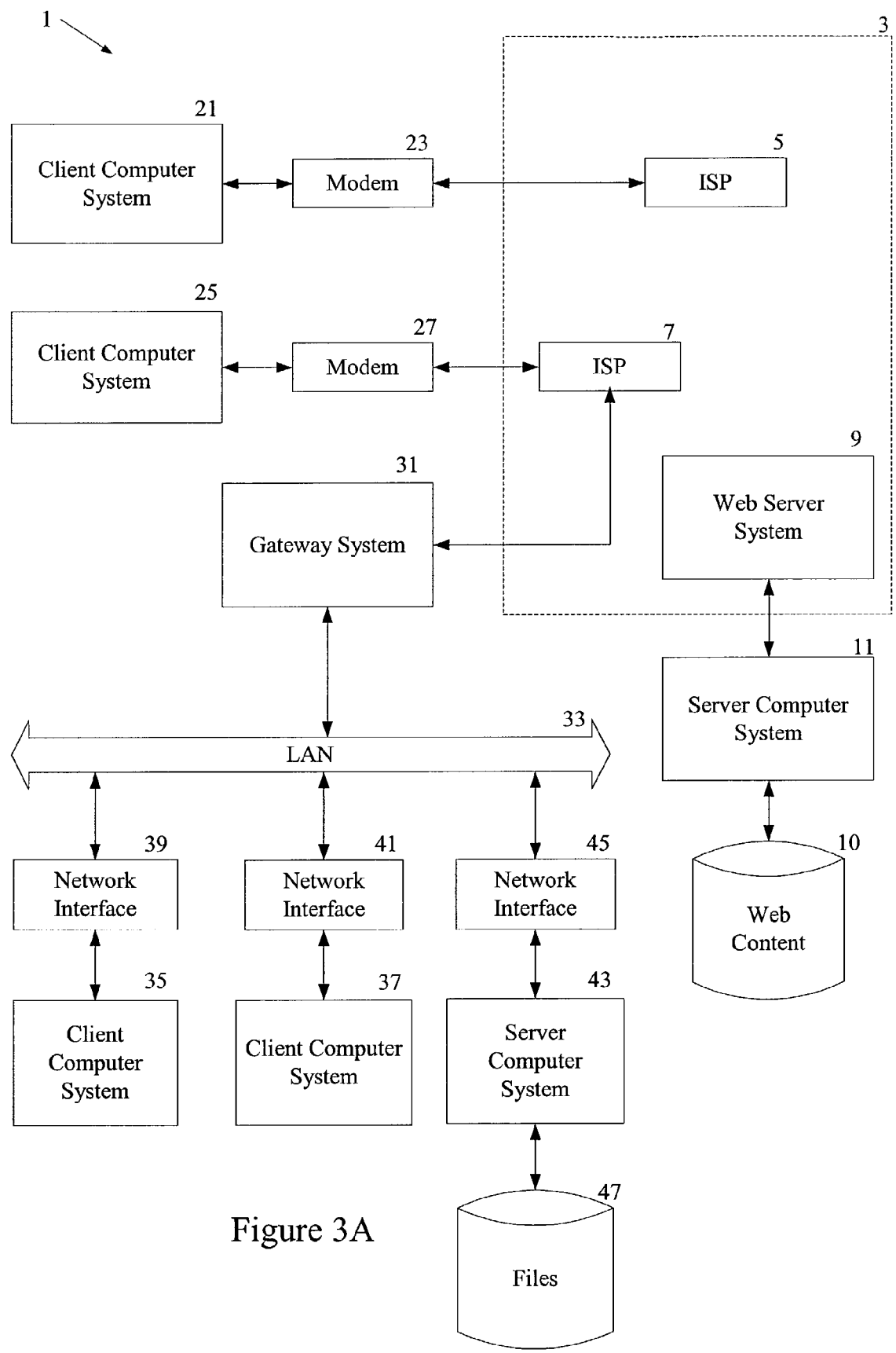
FIG. 3A is a diagram of one embodiment of an operating environment suitable for practicing the present invention.
Figure 3B:
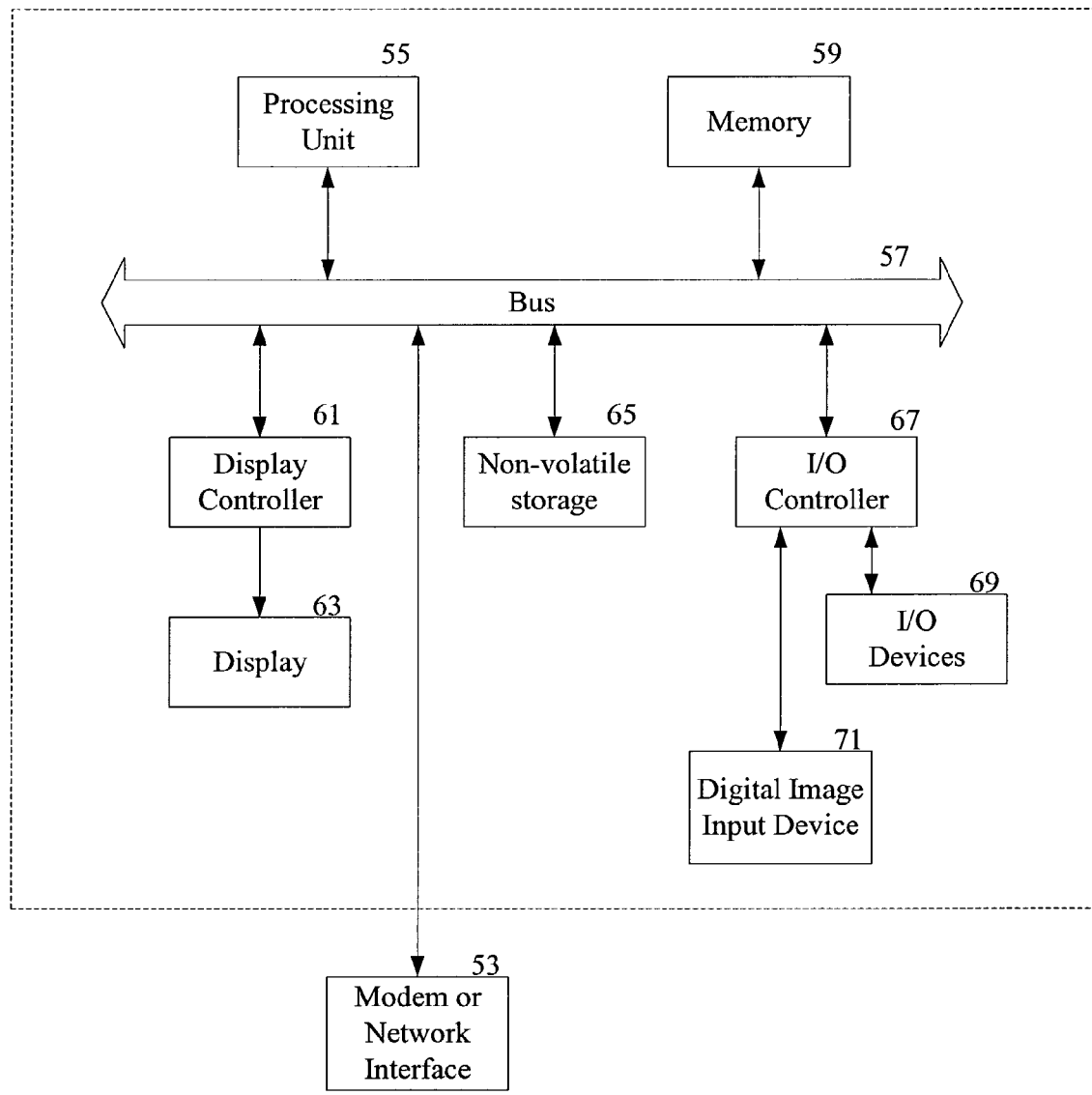
FIG. 3B is a diagram of one embodiment of a computer system suitable for use in the operating environment of FIG. 3A.

The following description of FIGS. 3A-B is intended to provide an overview of computer hardware and other operating components suitable for implementing the terminology database translation system, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 3A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 3A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 3A, the connections are not the same for these three computer systems. Client computer system 25 is coupled through a modem interface 27 while client computer systems 35 and 37 are part of a LAN. While FIG. 3A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processing unit 55 by a bus 57. Memory 59 can be dynamic random access memory (DRAM) and can also include static RAM (SRAM). The bus 57 couples the processing unit 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" includes any type of storage device that is accessible by the processing unit 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processing unit 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processing unit 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processing unit 55 to execute the various acts required by the operating system to input and output data and to store data in memory, including storing files on the non-volatile storage 65.

A translation system incorporating a terminology database has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although the invention has been described using English as the source language, any human language is suitable for the source or target languages.

The terminology used in this application with respect to databases is meant to include all types of data storage environments, including relational databases, indexed files, linked lists, and the like. Therefore, it is manifestly intended that this invention be limited only by the following claims and equivalents thereof.

What is claimed is:

1. A computerized method comprising:
converting a first text string formatted in a first external format of a plurality of external formats into an internal format;
searching a terminology database for an appropriate translation of the first text string to a requested first target language; and
in response to said searching resulting in finding no appropriate translation of the first text string from the terminology database, further performing a method comprising:
converting the first text string to an export format,
exporting the first text string formatted in the export format,
in response to said exporting, receiving a translation of the first text string in the first target language, wherein
the translation is formatted in the export format,
converting the translation of the first text string in the first target language into the internal format, and
storing the first text string and the translation of the first text string in the first target language in the terminology database, wherein
the first text string and the translation of the first text string are formatted in the internal format, and
the first text string and the translation of the first text string are logically linked.

2. The computerized method of claim 1 further comprising:
associating metadata with the first text string; and
exporting a portion of the metadata in conjunction with said exporting the first text string.

3. The computerized method of claim 2 wherein the metadata comprises:
an identification of the first targeted language.

4. The computerized method of claim 1 further comprising:
converting a second text string formatted in a second external format of the plurality of external formats into the internal format; and
searching the terminology database for an appropriate translation of the second text string to a requested second target language.

5. The computerized method of claim 4 further comprising:
if no appropriate translation is found in the terminology database,
converting the second text string to the export format,
exporting the second text string formatted in the export format,
in response to said exporting the second text string, receiving a translation of the second text string in the second target language and formatted in the export format, and
storing the second text string and the translation of the second text string in the second target language in the internal format in the terminology database.

6. The computerized method of claim 5 further comprising:
converting the translation of the second text string into the second external format of the plurality of external formats; and
transmitting the translation of the second text string in the second external format to a source of the second text string.

7. The computerized method of claim 4 further comprising:
when an appropriate translation of the second text string is found in the terminology database,
converting to appropriate translation to the second external format of the plurality of external formats, and
transmitting the translation of the second text string in the second external format to a source of the second text string.

8. The computerized method of claim 4 wherein searching the terminology database comprises:
comparing the second text string and metadata associated with the second text string against text strings previously stored in the terminology database and metadata associated with the text strings previously stored.

9. The computerized method of claim 1 further comprising:
initializing the terminology database with a set of glossary text strings and associated translations.

10. The computerized method of claim 1 further comprising:

evaluating the translation of the first text string for accuracy; and modifying the translation of the first text string to improve the accuracy.

11. The computerized method of claim 10, wherein evaluating the translation comprises:

presenting the translation of the first text string to a user.

12. The computerized method of claim 10, wherein modifying the translation comprises:

receiving a different translation of the first text string; and replacing the translation of the first text string with the different translation.

13. The computerized method of claim 1, wherein the translation for the first text string is one of a plurality of translations for the first text string.

14. The computerized method of claim 1 further comprising:

converting the stored translation of the first text string in the first target language into the first external format of the plurality of external formats.

15. The computerized method of claim 14 further comprising:

transmitting the translation of the first text string in the first external format of the plurality of external formats to a source of the first text string.

16. A machine-readable storage medium having executable instructions to cause a machine to perform a method comprising:

converting a first text string formatted in a first external format of a plurality of external formats into an internal format;

searching a terminology database for en appropriate translation of the first text string to a requested first target language; and in response to said searching resulting in finding no appropriate translation of the first text string from the terminology database, further performing a method comprising:

converting the first text string to an export format, exporting the first text string formatted in the export format, in response to said exporting, receiving a translation of the first text string in the first target language, wherein the translation is formatted in the export format, converting the translation of the first text string in the first target language into the internal format, and storing the first text string and the translation of the first text string in the first target language in the terminology database, wherein the first text string and the translation of the first text string are formatted in the internal format, and the first text string and the translation of the first text siring are logically linked.

17. The machine-readable storage medium of claim 16, wherein the method further comprises: associating metadata with the first text string; and exporting a portion of the metadata in conjunction with said exporting the first text sting.

18. The machine-readable storage medium of claim 17, wherein the method further comprises: creating the metadata.

19. The machine-readable storage medium of claim 16, wherein the method further comprises:

converting a second text string formatted in a second external format of the plurality of external formats into the internal format; and searching the terminology database for an appropriate translation of the second text string to a requested second target language.

20. The machine-readable storage medium of claim 19, wherein, when no appropriate translation is found in the terminology database, the method further comprises:

converting the second text string to the export format;

exporting the second text string formatted in the export format;

in response to said exporting the second text string, receiving a translation of the second text string in the second target language and formatted in the export format; and storing the second text siring and the translation of the second text string in the second target language in the internal format in the terminology database.

21. The machine-readable storage medium of claim 20, wherein the method further comprises;

converting the translation of the second text string into the second external format of the plurality of external formats;

transmitting the translation of the second text siring in the second external format to a source of the second text string.

22. The machine-readable storage medium of claim 19, wherein, when an appropriate translation is found in the terminology database, the method further comprises:

conventing the appropriate translation to the second external format of the plurality of external formats, and transmitting the translation of the second text swing in the second external format to a source of the second text string.

23. The machine-readable storage medium of claim 19, wherein searching the terminology database comprises:

comparing the second text string and metadata associated with the second text string against text strings previously stored in the terminology database and metadata associated with the text strings previously stored.

24. The machine-readable storage medium of claim 16, wherein the method further comprises:

initializing the terminology database with a set of glossary text strings and associated translations.

25. The machine-readable storage medium of claim 16, wherein the method further comprises:

evaluating the translation of the first text string for accuracy; and modifying the translation of the first text string to improve the accuracy.

26. The machine-readable storage medium of claim 25, wherein evaluating the translation comprises:

presenting the translation of the first text string to a user.

27. The machine-readable storage medium of claim 25, wherein modifying the translation comprises:

receiving a different translation of the first text string; and replacing the translation of the first text string with the different translation.

28. The machine-readable storage medium of claim 16, wherein the translation forte first text string is one of a plurality of translations for the first text siring.

29. The machine-readable storage medium of claim 16, wherein the method further comprises:

converting the stored translation of the first text string in the first target language into the first external format of the plurality of external formats.

30. The machine-readable storage medium of claim 29, wherein the method further comprises:

transmitting the translation of the first text sting in the first external format of the plurality of external formats to a source of the first text string.

31. A system comprising:
a processor coupled to a memory through a bus; and
a translation process executed from the memory by the processor to cause the processor to
convert a first text string formatted in a first external format of a plurality of external formats into an internal format,
search a terminology database for an appropriate translation of the first text string to a requested first target language, and
in response to said searching resulting in finding no appropriate translation of the first text string from the terminology database, further causing the processor to:
convert the first text string to an export format,
export the first text string formatted in the export format,
in response to said exporting, receive a translation of the first text string in the first target language, wherein the translation is formatted in the export format,
convert the translation of the first text string in the first target language into the internal format, and
store the first text string and the translation of the first text string in the first target language in the terminology database, wherein
the first text string and the translation of the first text string are formatted in the internal format, and
the first text string and the translation of the first text string are logically linked.

32. The system of claim 31, wherein the translation process further causes the processor to associate metadata with the first text string, and export a portion of the metadata in conjunction with said exporting the first text string.

33. The system of claim 32, wherein the translation process further causes the processor to create the metadata.

34. The system of claim 31, wherein the translation process further causes the processor to convert a second text swing formatted in a second external format of the plurality of external formats into the internal format, and search the terminology database for an appropriate translation of the second text string to a requested second target language.

35. The system of claim 34, wherein, when no appropriate translation is found in the terminology database, the translation process further causes the processor to
convert the second text string to the export format,
export the second text string formatted in the export format,
receive a translation of the second text swing in the second target language and formatted in the export format, and
store the second text string and the translation of the second text string in the second target language in the internal format in the terminology database.

36. The system of claim 35, wherein the translation process further causes the processor to convert the translation of the second text string into the second external format of the plurality of external formats for transmission to a source of the second text string.

37. The system of claim 34, wherein, when an appropriate translation is found in the terminology database, the translation process further causes the processor to convert the appropriate translation to the second external format of the plurality of external formats for transmission to a source of the second text string.

38. The system of claim 34, wherein the translation process further causes the processor to compare the second text string and metadata associated with the second text string against text strings previously stored in the terminology database and metadata associated with the text strings previously stored to search the terminology database.

39. The system of claim 31, wherein the translation process further causes the processor to initialize the terminology database with a set of glossary text strings and associated translations.

40. The system of claim 31, wherein the translation process further causes the processor to evaluate the translation of the first text string for accuracy, and modify the translation of the first text string to improve the accuracy.

41. The system of claim 40, wherein the translation process further causes the processor to present the translation of the first text string to a user.

42. The system of claim 40, wherein the translation process further causes the processor to receive a different translation of the first text string, and replace the translation of the first text string with the different translation.

43. The system of claim 31, wherein the translation for the first text string is one of a plurality of translations for the first text string.

44. The system of claim 31, wherein the translation process further causes the processor to convert the stored translation of the first text string in the first target language into the first external format of the plurality of external formats.

45. The system of claim 44, wherein the translation process further causes the processor to transmit the translation of the first text string in the first external format of the plurality of external formats to a source of the first text string.

* * * * *

UNITED STATES PATENT AND TRADEMARK OFFICE
CERTIFICATE OF CORRECTION

PATENT NO. : 7,308,399 B2
APPLICATION NO. : 10/177891
DATED : December 11, 2007
INVENTOR(S) : Fallen-Bailey et al.

It is certified that error appears in the above-identified patent and that said Letters Patent is hereby corrected as shown below:

In column 5, line 67, delete "sting" and insert -- string --, therefor.

In column 10, line 50, in Claim 7, after "converting" delete "to" and insert -- the --, therefor.

In column 11, line 32, in Claim 16, delete "en" and insert -- an --, therefor.

In column 11, line 54, in Claim 16, delete "siring" and insert -- string --, therefor.

In column 11, line 59, in Claim 17, delete "sting." and insert -- string. --, therefor.

In column 12, line 14, in Claim 20, delete "siring" and insert -- string --, therefor.

In column 12, line 18, in Claim 21, after "comprises" delete ";" and insert -- : --, therefor.

In column 12, line 22, in Claim 21, delete "siring" and insert -- string --, therefor.

In column 12, line 28, in Claim 22, delete "conventing" and insert -- converting --, therefor.

In column 12, line 31, in Claim 22, delete "swing" and insert --string --, therefor.

In column 12, line 59, in Claim 28, delete "forte" and insert -- for the --, therefor.

In column 12, line 60, in Claim 28, delete "siring." and insert -- string. --, therefor.

In column 13, line 1, in Claim 30, delete "sting" and insert -- string --, therefor.

UNITED STATES PATENT AND TRADEMARK OFFICE
CERTIFICATE OF CORRECTION

PATENT NO.         : 7,308,399 B2
APPLICATION NO.    : 10/177891
DATED              : December 11, 2007
INVENTOR(S)        : Fallen-Bailey et al.

It is certified that error appears in the above-identified patent and that said Letters Patent is hereby corrected as shown below:

In column 13, line 43, in Claim 34, delete "swing" and insert -- string --, therefor.

In column 13, line 53, in Claim 35, delete "swing" and insert -- string --, therefor.

Signed and Sealed this

Twenty-first Day of October, 2008

JON W. DUDAS
*Director of the United States Patent and Trademark Office*